United States Patent Office 2,848,370
Patented Aug. 19, 1958

2,848,370

11-β-HYDROXYLATION OF STEROIDS WITH PYCNOSPORIUM

Jacob W. Davisson, Levittown, and Donald A. Kita, Jackson Heights, N. Y., and John B. Routten, Tenafly, N. J., assignors to Chas. Pfizer & Co., Inc., New York, N. Y., a corporation of Delaware No Drawing. Application May 29, 1953
Serial No. 358,564

8 Claims. (Cl. 195—51)

This invention is concerned with a method for the conversion of certain steroid compounds by means of a selected microorganism to the corresponding 11-hydroxylated products. The invention is particularly useful for the introduction of an 11-β-hydroxyl group into the steroid nucleus.

The preparation of steroid compounds oxygenated at the 11-position of the nucleus is a highly desirable and often difficult synthesis to accomplish. Certain biologically active compounds, notably compound F (Kendall's Compound F or 17-hydroxycorticosterone) and compound E (Kendall's Compound E or 17-hydroxy-11-dehydrocorticosterone) are among this group. Compound S (17-hydroxy-11-desoxycorticosterone) may be prepared by certain known methods from such available starting materials as soy bean sterols and other substances of this nature. The conversion of this material by the process of the present invention to compound F may be accomplished most readily and relatively inexpensively as compared to chemical methods.

Other methods have been reported for converting compound S to compound F by means of organisms differing from that described below for the present process. In the U. S. Patent 2,658,023 issued November 3, 1953, to Gilbert M. Shull et al., there is described the use of certain organisms of the genus Curvularia for this purpose. In U. S. Patent 2,602,769, the use of *Cunninghamella blakesleena* is reported and in the Journal of the American Chemical Society (vol. 74, p. 2381 (1952)), the use of *Streptomyces fradiae* for this purpose is reported.

It has now been discovered that an organism which is a species of the genus Pycnosporium is highly useful for introducing in the β-configuration at the 11-position of various steroid compounds an hydroxyl group. The Pycnosporium genus is of the order Sphaeropsidales which is of the class Fungi Imperfecti. It is described by Siegel in Centr. f. Bakt. 51, 515 (1909) and by Bender in "Genera of Fungi Imperfecti" (Yale University Thesis, 1931), page 1287. It is also listed in Ainsworth et al., "A dictionary of the Fungi" (Commonwealth Mycol. Inst. 1954), page 301, and in Clements and Shear, "The Genera of Fungi" (H. W. Wilson Co. 1931), page 370. The particular organism that we have found to be uniquely useful is obtainable from the Philadelphia Quartermaster Corps Depot of the United States Army under the culture number QM703. A living culture of this organism has been deposited with the American Type Culture Collection at Washington, D. C., and added to its permanent collection of microorganisms as ATCC #12,231. This species QM703 is listed in "Farlowia" 4 (1), 45–86 at 77 (1950) by Reese et al. It should be realized that not only organisms conforming exactly to the description of QM703 but also mutants thereof and variants of this organism may also be used.

It has been found that by contacting a steroid compound having a methylene group at the 11-position of the nucleus with living cultures of Pycnosporium sp. QM703 or with suitable extracts or with the mycelium of this organism the steroid compound is converted to the corresponding 11-β-hydroxylated product. The reaction is particularly suitable for the conversion of compound S or its mono- or di-esters (e. g. di-acetate or 17- or 21- mono-acetate) to compound F. In general, the reaction should be conducted under aerobic conditions. If the organism is cultivated in nutrient solutions and the steroid substrate is added either at the beginning of growth of the microorganism or after growth has been established there is a ready conversion of the steroid compound to the corresponding 11-β-hydroxylated derivative.

A variety of steroid compounds may be used as starting materials in the present process. These may bear substituents at various positions of the nucleus such as side chains at the 17-position and keto, hydroxyl or protected hydroxyl groups at the 3-position. Double bonds may be present in the nucleus, for instance, at the 3-4 position or at the 5-6 position. The yield of oxygenated product obtained in the present process will vary to some extent with the nature of the steroid compound used, with the conditions employed for the reaction such as temperature, time of exposure, pH, nutrient medium and the time at which the compound is added to the medium. However, these various conditions can be adjusted and the optimum conditions determined for a given compound by a minimum of routine experimentation.

It is found that aerobic fermentation at a temperature of about 25–30° C. for at least about one day after addition of the steroid compound and the use of a medium furnishing carbohydrate, growth promoting materials, a source of nitrogen and inorganic salts is particularly favorable.

The products produced by the present process may be analyzed readily by such means as paper chromatographic techniques. This enables the study of variation in conditions on a small scale, since very small samples of the products may be analyzed by the technique referred to. Methods of this nature have been published heretofore. Details for such methods are given in U. S. Patent 2,602,-769, issued on July 8, 1952, to H. C. Murray et al., in the copending patent application Serial No. 431,619, filed May 21, 1954 (which is in part a continuation of the now abandoned application Serial No. 276,678, filed March 14, 1952, by Gilbert M. Shull et al.) and in a publication by Shull et al. in the Archives of Biochemistry, vol. 37, p. 186 (1952).

A variety of materials may be used in nutrient media for the growth of the Pycnosporium species used in our process. Nutrient materials include carbohydrates, such as glucose, sucrose, maltose, and other sugars and starches. Technical materials which are known to contain nutrient substances, such as soybean meal, peanut meal, corn steep liquor and other such materials, are also useful. Various salts including nitrates, sulfates, and phosphates, and metallic compounds, such as potassium, sodium and magnesium, may be used to supplement the medium. In general, it is preferred to operate the fermentation process at a temperature of about 24° to 30° C. The growth of the microorganism generally takes from one to three days. As mentioned above, the steroid substrate may be added when the fermentation is started or it may be added after growth is substantially established, for instance, after 16 to 24 hours. Alternatively, the mycelium formed during the growth of the microorganism in the nutrient medium may be removed, washed with water, if desired, and resuspended in water containing the steroid substrate. Agitation of this mixture in the presence of air results in the formation of the desired oxygenated product.

Steroid products formed by oxygenation according to the present process may be isolated by several different methods. Most useful is the extraction of the fermentaylenechloride, ethylene chloride, and so forth. Other water-immiscible solvents, such as aliphatic alcohols, e. g. butgenated, aliphatic compounds, such as chloroform, methylene chloride, ethylene chloride, and so forth. Other water-immiscible solvents, such as aliphatic alcohols, e. g. butanol, pentanol, etc., ketones, such as methyl isobutyl ketone, and esters, such as butyl acetate, may be used for this purpose. The extracts obtained in this manner may be concentrated to dryness to obtain the solid steroid product. However, in many cases, it may be desired to further purify the material, such as by recrystallization from a suitable solvent, e. g. lower halogenated hydrocarbons, lower alcohols and esters. Alternatively, the product may be subjected to purification by methods such as chromatography. The use of columns containing silica gel which is treated with a lower alcohol, such as ethanol (the use of one gram of ethanol per gram of silica gel is quite suitable) is particularly effective. The product may be placed on the chromatographic column as a solution in a lower aliphatic halogenated hydrocarbon and the column may be developed using the same or a similar solvent containing a minor proportion (e. g. 1 to 5%) of a lower aliphatic alcohol (methanol or ethanol). It is often found that part of the starting material is left unconverted during the usual process. This may be recovered from the column and utilized in other preparations. The product may then be recovered by eluting the product with a solvent indicated above, selecting suitable fractions by analysis with paper chromatography. Concentration of solutions of the product yields the solid purified product, generally in crystalline form and in high purity. Certain by-products may be formed by the reaction and these may be separated by column chromatography. These sometimes include certain other more highly oxygenated compounds. In general, yields of at least about 25% or higher of the desired product are obtained during the present process.

The following examples are given by way of illustration and are not to be considered as the only manner in which this invention may be embodied. It is to be understood that protection hereof is only to be limited by the specific wording of the appended claims.

*Example I*

A culture of Pycnosporium species QM703 was propagated in tubes on an agar nutrient medium. The organism was rinsed from the agar slant under sterile conditions into a sterile medium having the following composition:

|  | Percent |
|---|---|
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |
| Distilled water, adjusted to pH 7.0 with potassium hydroxide. | |

One hundred milliliters of the medium was used in each of several 300-milliliter flasks. The contents of one flask, after seven days of growth, was added to two liters of a sterile medium having the following composition:

|  | Percent |
|---|---|
| Sucrose | 1 |
| Difco tryptone | 1 |
| Sodium nitrate | 0.2 |
| Dipotassium hydrogen phosphate | 0.1 |
| Magnesium sulfate heptahydrate | 0.05 |
| Potassium chloride | 0.05 |
| Ferrous sulfate heptahydrate | 0.001 |

This mixture was adjusted to pH 7 with sulfuric acid and 0.25% of calcium carbonate was added before the mixture was sterilized. To the inoculated medium was added one-half gram of compound S dissolved in 20 milliliters of 95% ethanol. The mixture was then aerated at the rate of about one volume of air per volume of solution per minute at about 28° C. for 24 hours. A mechanical agitator operating at about 1500 revolutions per minute was used in the fermentation vessel. The fermentation was continued for 24 hours.

The whole fermentation broth and mycelium was removed from the vessel and extracted three times with one-third volume of methylene chloride. The organic phases were combined, filtered and concentrated under vacuum to a few milliliters' volume. The solution was added to a column containing silica gel prepared by treating anhydrous silica gel with one milliliter of 95% ethanol per gram of solid. The silica gel column containing the steroids was developed by the application of a solution of three volumes of 95% ethanol in 97 volumes of methylene chloride. Portions of the effluent from the column were analyzed at regular intervals by means of the paper chromatographic system described above. The first material leaving the column was some recovered compound S. A solution of this material was concentrated to obtain the compound S in solid form for reuse. In subsequent fractions the product, compound F, was found. Additional materials which may be more highly oxygenated or oxygenated in a different position are also formed during the fermentation and are separated by chromatographic purification. A yield of approximately 27% of crystalline compound F is obtained by concentration of the selected eluates from the column and evaporation to dryness. The product may be recrystallized from ethyl acetate or other suitable solvents and is identical in properties with standard samples of compound F.

*Example II*

A culture of Pycnosporium species QM703 was added to a sterile 100-milliliter portion of the following medium in a 300-milliliter flask:

|  | Percent |
|---|---|
| Sucrose | 1 |
| Difco tryptone | 1 |
| Sodium nitrate | 0.2 |
| Dipotassium hydrogen phosphate | 0.1 |
| Magnesium sulfate heptahydrate | 0.05 |
| Potassium chloride | 0.05 |
| Ferrous sulfate heptahydrate | 0.001 |

To the flask was added 50 milligrams of progesterone. The fermentation mixture was agitated at a temperature of 28° C. under sterile conditions for seven days. The mixture was removed from the flask and it was extracted three times with one-half volume of hot (70° C.) ethylene dichloride. The solvent layers were combined and concentrated under vacuum to dryness. The residual solid was dissolved in a small volume of ethanol and a sample of this material was subjected to paper chromatography. This showed the presence of 11-hydroxyprogesterone as well as some unreacted progesterone and other oxygenated products.

*Example III*

The experiment described in Example II was repeated but utilizing 50 milligrams of desoxycorticosterone rather than progesterone. The product obtained was subjected to paper chromatography and it was indicated that the starting material had been hydroxylated at the 11-position to produce corticosterone.

What is claimed is:

1. A process for the 11-β-hydroxylation of a steroid compound having a methylene group at the 11-position, which comprises contacting said steroid compound with a material selected from the class consisting of a living culture of the microorganism Pycnosporium sp. ATCC 12,231 and the mycelium of said microorganism.

2. A process as claimed in claim 1 wherein the steroid compound is contacted with the growing organism at a temperature of from about 25° C. to about 30° C. for at least one day in a medium containing carbohydrate, growth promoting materials, a source of nitrogen and inorganic salts.

3. A process as claimed in claim 1 wherein the steroid is compound S.

4. A process as claimed in claim 1 wherein the steroid is progesterone.

5. A process as claimed in claim 1 wherein the steroid is desoxycorticosterone.

6. A process as claimed in claim 1 wherein the 11-β-hydroxylated product is recovered by solvent extraction.

7. A process for the 11-β-hydroxylation of a steroid compound which comprises cultivating a culture of Pycnosporium sp. ATCC 12,231 under aerobic conditions in an aqueous nutrient medium containing the compound.

8. A process for the preparation of Compound F which comprises cultivating a culture of Pycnosporium sp. ATCC 12,231 under aerobic conditions in an aqueous nutrient medium containing compound S.

References Cited in the file of this patent

UNITED STATES PATENTS

| | | |
|---|---|---|
| 2,649,400 | Murray et al. | Aug. 18, 1953 |
| 2,649,402 | Murray et al. | Aug. 18, 1953 |

FOREIGN PATENTS

| | | |
|---|---|---|
| 347,651 | Australia | Aug. 19, 1951 |
| 446,051 | Australia | Aug. 13, 1951 |

OTHER REFERENCES

Bessey: Morphology and Taxonomy of Fungi, The Blakiston Co., Phila., 1950, pp. 15 to 18.

Virology: Journal of Bacteriology: Mycologia.

Perlman et al., J. A. Chem. Soc., vol. 47, page 2126, April 1952.

UNITED STATES PATENT OFFICE
CERTIFICATE OF CORRECTION

Patent No. 2,848,370

August 19, 1958

Jacob W. Davisson et al.

It is hereby certified that error appears in the above numbered patent requiring correction and that the said Letters Patent should read as corrected below.

Column 2, line 72, beginning with "ylenechloride, ethylene chloride," strike out all to and including "chloroform, meth-" in column 3, line 2, and insert instead the following:

>     tion mixture containing the product with certain
>     water-immiscible solvents; particularly useful are
>     lower halogenated, aliphatic compounds, such as
>     chloroform, meth- Signed and sealed this 30th day of June 1959.

(SEAL)
Attest:

KARL H. AXLINE
Attesting Officer

ROBERT C. WATSON
Commissioner of Patents